(12) United States Patent
Ito et al.

(10) Patent No.: US 7,437,488 B2
(45) Date of Patent: Oct. 14, 2008

(54) INTERFACE FOR CAR-MOUNTED DEVICES

(75) Inventors: Takafumi Ito, Toyota (JP); Yuuichi Kumazawa, Okazaki (JP)

(73) Assignee: Denso Corporation, Kariya (JP)

( * ) Notice: Subject to any disclaimer, the term of this patent is extended or adjusted under 35 U.S.C. 154(b) by 602 days.

(21) Appl. No.: 10/974,721

(22) Filed: Oct. 28, 2004

(65) Prior Publication Data

US 2005/0134117 A1 Jun. 23, 2005

(30) Foreign Application Priority Data

Dec. 17, 2003 (JP) .............................. 2003-419752

(51) Int. Cl.
*G06F 3/00* (2006.01)
*G06F 13/12* (2006.01)
(52) U.S. Cl. .............................. 710/15; 710/5; 710/19; 710/62; 710/72
(58) Field of Classification Search ............ 710/5, 710/15, 19
See application file for complete search history.

(56) References Cited

U.S. PATENT DOCUMENTS

| 6,181,343 | B1 * | 1/2001 | Lyons | ....................... 715/850 |
|---|---|---|---|---|
| 6,498,970 | B2 * | 12/2002 | Colmenarez et al. | .......... 701/36 |
| 6,703,999 | B1 | 3/2004 | Iwanami et al. | |
| 2001/0020837 | A1 * | 9/2001 | Yamashita et al. | .......... 318/567 |
| 2002/0181773 | A1 | 12/2002 | Higaki et al. | |
| 2004/0056907 | A1 * | 3/2004 | Sharma et al. | .............. 345/863 |

FOREIGN PATENT DOCUMENTS

| JP | A-10-31551 | 2/1998 |
|---|---|---|
| JP | A-2000-75991 | 3/2000 |
| JP | A-2002-182680 | 6/2002 |

* cited by examiner

*Primary Examiner*—Alan Chen
(74) *Attorney, Agent, or Firm*—Posz Law Group, PLC

(57) ABSTRACT

An interface for car-mounted devices includes hand data detecting means for determining devices to be controlled among the car-mounted devices based upon hand data corresponding to an operator hand state, voice recognizing means for determining how to change the state of the devices to be controlled based upon an operator voice utterance, and control signal-forming means for forming control signals for the devices to be controlled relying upon the devices to be controlled determined by said hand data detecting means and upon the content of change determined by said voice recognizing means.

19 Claims, 15 Drawing Sheets

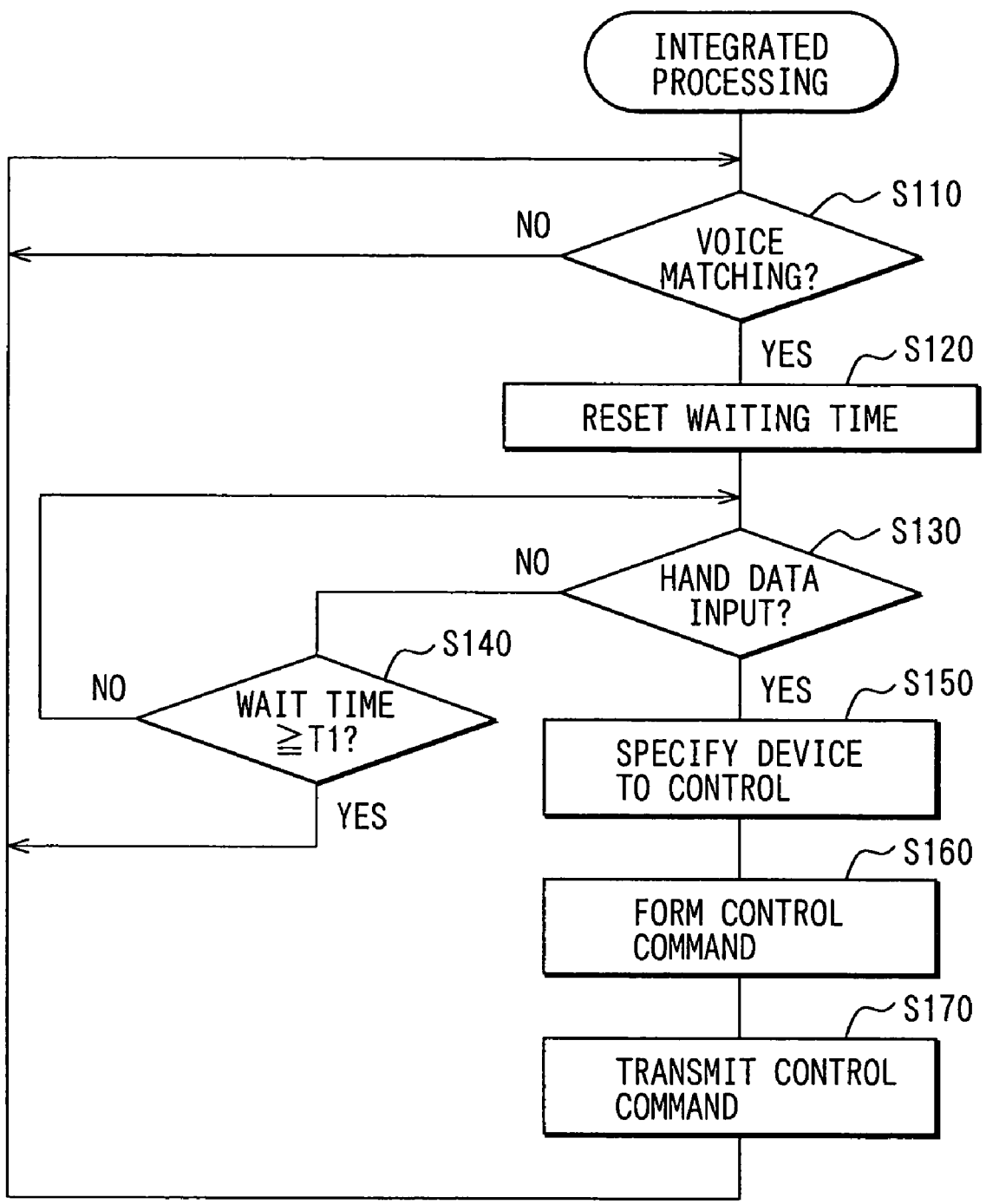

INPUT IMAGE

MASKED IMAGE

ENCODED IMAGE

FIG. 7A
HAND DICTIONARY
| PATTERN No. | REGISTERED PATTERN |
|---|---|
| 1 | 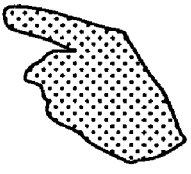 |
| 2 | 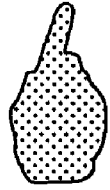 |
| 3 | 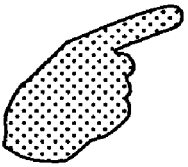 |
FIG. 7B
DEVICE DATA TABLE
| PATTERN No. | CONTROLLED DEVICE | OPERATING STATE |
|---|---|---|
| 1 | RIGHT A/C VENT | OPEN |
| 2 | MAP LAMP | OFF |
| 3 | LEFT A/C VENT | CLOSE |

FIG. 8A

DEVICE DATA TABLE

| PATTERN No. | CONTROLLED DEVICE | RESERVED WORDS |
|---|---|---|
| 1 | RIGHT A/C VENT | OPEN |
| | | CLOSE |
| 2 | MAP LAMP | ON |
| | | OFF |
| 3 | LEFT A/C VENT | OPEN |
| | | CLOSE |

FIG. 8B

DEVICE DATA TABLE

| PATTERN No. | CONTROLLED DEVICE | ID DATA | OPERATING STATE OR RESERVED WORD | OPERATION SPECIFYING DATA |
|---|---|---|---|---|
| 1 | RIGHT A/C VENT | COMP. INSTRUCT | — | CONVERSION DATA |
| 2 | MAP LAMP | SINGLE INSTRUCT | OFF | — |
| 3 | LEFT A/C VENT | COMP. INSTRUCT | — | CONVERSION DATA |

MOTION DICTIONARY

| PATTERN No. | VECTOR SERIES | CORRESPONDING HAND MOTION |
|---|---|---|
| 1 | aaa | UP |
| 2 | cgcgcgcg | SHAKE |
| 3 | abcdefgh | CIRCLE |

DEVICE DATA TABLE

| PATTERN No. | CONTROLLED DEVICE | OPERATING STATE |
|---|---|---|
| 1 | MAP LAMP | OFF |
| 2 | DOOR MIRRORS | OPEN |
| 3 | A/C VENTS | CLOSE |

US 7,437,488 B2

INTERFACE FOR CAR-MOUNTED DEVICES

CROSS REFERENCE TO RELATED APPLICATION

This application is based upon, claims the benefit of priority of, and incorporates by reference the contents of Japanese Patent Application No. 2003-419752 filed on Dec. 17, 2003.

FIELD OF THE INVENTION

This invention relates to an interface for car-mounted devices for operating, in a non-contacting manner, a plurality of car-mounted devices spatially arranged in a scattered manner.

BACKGROUND OF THE INVENTION

For enhancing safety in driving a vehicle, technology has been proposed to enable a driver to operate various car-mounted devices such as a navigation unit, audio equipment, air conditioner, etc. without requiring the driver to greatly divert attention, such as, moving eyes to see a greatly deviated direction, extending his arms, and so on. There have been known, for example, devices for inputting instructions and data by gesture (body action or waving a hand) by utilizing image recognition (e.g., see JP-A-2000-75991 and JP-A-2002-149304) and devices for inputting instruction uttering predetermined words by utilizing voice recognition.

Among them, the devices utilizing image recognition must be designed so that the gestures that are used are simple and don't divert the operator's attention from the driving. When the gestures are simple, however, it may happen that an unintended motion by the operator is incorrectly recognized as a meaningful gesture, thereby resulting in incorrect operation of one or more of the car-mounted devices.

By using the devices utilizing the voice recognition, on the other hand, the operator must learn reserved words. When the operation is complex or when there are many car-mounted devices that must be operated, however, the operator finds it difficult to learn a lot of reserved words.

In recent years, on the other hand, a method for recognizing voice in a natural language has been researched. However, successful implementation of such a method is still a very long way from realization. Even if it was realized, there would still be a problem related to the processing ability of the CPU that is mounted on a vehicle not being able to maintain the operation in real time.

Further, when the instruction and data include a spatial position, it is very difficult to express the spatial position by using a natural language. Even if the natural language voice recognition is possible, it is difficult to give a proper instruction or information.

SUMMARY OF THE INVENTION

In order to solve the above problems, a concern of the present disclosure is to provide an interface for car-mounted devices capable of reliably operating a plurality of car-mounted devices in a non-contacting manner without the need of learning complex gestures or a lot of reserved words.

In the interface for car-mounted devices, control signal-forming means specifies a device mounted on the car that is to be controlled based upon a combination of the result detected by hand data detecting means that detects hand data expressing the state of the operator's hand and the result recognized by voice recognizing means that recognizes the word uttered by the operator, and forms a control signal for the device that is to be controlled.

Namely, the device to be controlled is specified not by relying upon the gesture alone or the voice alone, but by relying upon a combination of the two. Even by using a simple gesture of hand and a simple word, therefore, it is possible to greatly reduce the risk that the unintended motion or the utterance of the word of the operator is incorrectly recognized to be meaningful.

The state of hand clearly expresses matters that can be difficultly expressed by words, such as a spatial position. As compared to the case of using only voice recognition, the operator's intention can be reliably specified with a small amount of processing.

It is preferable that the state of hand expressing the hand data includes at least any one of the shape of hand, the motion of hand or the position of hand. Further, it is considered that the shape of hand expresses, particularly, the direction of hand (direction pointed by a finger).

The direction of hand can be preferably used for specifying the direction in which the device to be controlled is located. Further, when the device to be controlled is an air conditioner, the position of hand is effective in concretely specifying the position to where the air is to be blown.

Here, if, for example, a preset demonstrative pronoun is recognized by the voice recognizing means, the control signal-forming means specifies the device to be controlled based on the hand data detected by the hand data detecting means, and forms a control signal for changing over the operating condition of the specified device that is to be operated.

In this case, when the shape of hand or the motion of hand is used as hand data, and the direction of hand specified by the shape of hand is corresponded to the car-mounted device in advance or the direction specified by the motion of hand is corresponded to the car-mounted device in advance, by simply directing the hand to the car-mounted device that is desired to be controlled, or by moving the hand toward the car-mounted device, followed by the utterance of the demonstrative pronoun such as "this" or "it", any desired car-mounted device can be selected.

Accordingly, the operator simply makes his hand gesture and utters a demonstrative pronoun to very easily and reliably select a device to be controlled even when he has forgotten the name of the device to be controlled or cannot correctly utter its name.

The device to be controlled is not selected unless the demonstrative pronoun is uttered. Therefore, the device to be controlled is not selected by the simple hand gesture even when it is unintendedly made by the operator.

The control signal-forming means may be so constituted as to specify the device to be controlled based on the hand data detected by the hand data detecting means, and to form a control signal for causing the specified device to operate to meet the reserved word when the reserved word corresponding to the operation for the specified device is recognized by the voice recognizing means.

That is, when the operation of the device to be controlled can be expressed by a word that can be intuitively comprehended (such as "turn on" or "turn off"), the word may be used as a reserved word to obtain the same effect as that of when the above demonstrative pronoun is used because it requires a small burden to store the reserved word.

Moreover, when the above demonstrative pronoun is used under a condition where there are a plurality of devices to be controlled, it becomes necessary to conduct plural operations to place the specified devices in a desired state. By using a reserved word, however, the devices to be controlled can be changed over to a desired state through one time of operation.

Further, the control signal-forming means may be so constituted that the device to be controlled is specified based on the hand data detected by the hand data detecting means when, for example, a preset demonstrative pronoun is recognized by the voice recognizing means, and a control signal for causing the specified device to operate to meet the reserved word is formed when the reserved word corresponding to the operation for the specified device is recognized by the voice recognizing means during an allowable time set in advance after the device to be controlled is specified.

Further, the control signal-forming means may be constituted so that the device to be controlled is specified based on the hand data detected by the hand data detecting means when, for example, a preset demonstrative pronoun is recognized by the voice recognizing means, and a control signal for specifying the operation of the device to be controlled is formed based on the hand data detected by the hand data detecting means and for causing the specified device to operate when the preset demonstrative pronoun is recognized again by the voice recognizing means during an allowable time set in advance after the device to be controlled is specified.

Namely, the operation for specifying the device to be controlled and the operation for specifying the operation for the device to be controlled are not executed at one time but are executed in two steps.

In these cases, when the respective operations in the respective two steps are not proper, the device is not operated. This more reliably prevents incorrect operation of the device which is not intended by the operator.

In the latter case, in particular, the operation for the device to be controlled is not corresponded to the voice (reserved word) but is corresponded to the hand data (state of hand), and the voice is used as a trigger, thereby making it possible to very easily and reliably select the device to be controlled and to select the operation for the device to be controlled relying only upon the demonstrative pronoun and the gesture (gesture of hand).

When, for example, the position of the hand is used as the hand data in specifying the operation, the direction in which the air is blown out from the vent of the air conditioner is controlled to be directed to the position of the hand, making it possible to instruct the control amount in an analog manner (continuously).

The interface for car-mounted devices of the invention may be provided with operation permission means which detects the position of the operator's hand and permits the operation of the hand data detecting means or of the control signal-forming means when the position of the hand is in a preset specified region.

In this case, the device to be controlled is not selected or the operation for the device to be controlled is not executed unless the operator inputs the hand data by placing his hand in the specified region. This more reliably prevents incorrect operation that is not intended by the operator.

Here, the operation permission means may be so constituted as to detect the position of the operator's hand based on the image inputs from a camera which is so disposed as to image the specified region.

In this case, it is preferable that the camera is so disposed as to image the specified region at such an angle as will not include the passengers or the outer scenery (which moves) on the background as much as possible. As a result, the amount of processing at the time of extracting the imaged hand can be greatly reduced while improving the precision of extracting.

When the shape of hand is used as the hand data, the hand data detecting means may be so constituted that the extracting means extracts the hand portion which is a region where the hand is imaged by the input image from the camera imaging the operator's hand, and that the shape specifying means compares the shape of hand portion picked up by the extracting means with the shape of the templates that have been prepared in advance, and specifies the shape of the most matching template as the shape of hand. The shape of hand specified by the shape specifying means is used as the hand data.

When the position of hand is used as the hand data, further, the hand data detecting means may be so constituted that the extracting means extracts the hand portion which is a region where the hand is imaged by the input image from the camera imaging the operator's hand, and that the position specifying means specifies the center of gravity of the hand portion picked up by the extracting means as the position of hand. The position of hand specified by the position specifying means is used as the hand data.

Further, when the motion of hand is used as the hand data, the hand data detecting means may be so constituted that the extracting means extracts the hand portion which is a region where the hand is imaged by the input image from the camera imaging the operator's hand, that the position specifying means specifies the center of gravity of the hand portion picked up by the extracting means as the position of hand and that the motion specifying means specifies the time-series change in the position of hand specified by the position specifying means as the motion of hand. The motion of the hand specified by the motion specifying means is used as the hand data.

The extracting means may be so constituted as to use at least either the brightness or the color data of pixels constituting the input image as data for extracting, and use, as the hand portion, a region in the permissible range where the data for extracting have been set in advance in the input image.

Here, however, the brightness or the color data varies depending upon the surrounding conditions (weather, direction of incidence of sunlight, etc.). When the permissible range of data for extracting is fixed, therefore, the detection precision varies depending upon the surrounding conditions.

It is therefore preferable that the hand data detecting means finds a difference between time-series frames in the input image to pick up a region where there is a motion in the input image and set a permissible range of data for extracting based on an average value of data for extracting in the region that is picked up.

Further, the hand data detecting means may be so constituted as to detect the hand data in a three-dimensional manner based on the input image from a plurality of cameras arranged at different positions.

In this case, the degree of freedom increases in the direction of motion even when the motion is simple. Therefore, even a simple motion can be used for specifying an increased number of devices and operations depending upon the direction of motion.

It is preferable that the control signals formed by the control signal-forming means are sent to the devices to be controlled through, for example, a communication network for connecting the car-mounted devices to each other, i.e., the interface for the car-mounted devices is connected to the car-mounted devices through the communication network.

BRIEF DESCRIPTION OF THE DRAWINGS

The above and other objects, features and advantages of the present invention will become more apparent from the following detailed description made with reference to the accompanying drawings. In the drawings:

FIG. 4 is a flowchart illustrating the contents of processing executed by an integrated control unit according to the first embodiment;

FIGS. 7A-7B are diagrams illustrating a hand dictionary and a device data table according to the first embodiment;

FIGS. 8A-8B are diagrams illustrating device data tables according to second and third embodiments;

DESCRIPTION OF THE PREFERRED EMBODIMENTS

Embodiments of the invention will now be described with reference to the accompanying drawings.

First Embodiment

Figure 1:
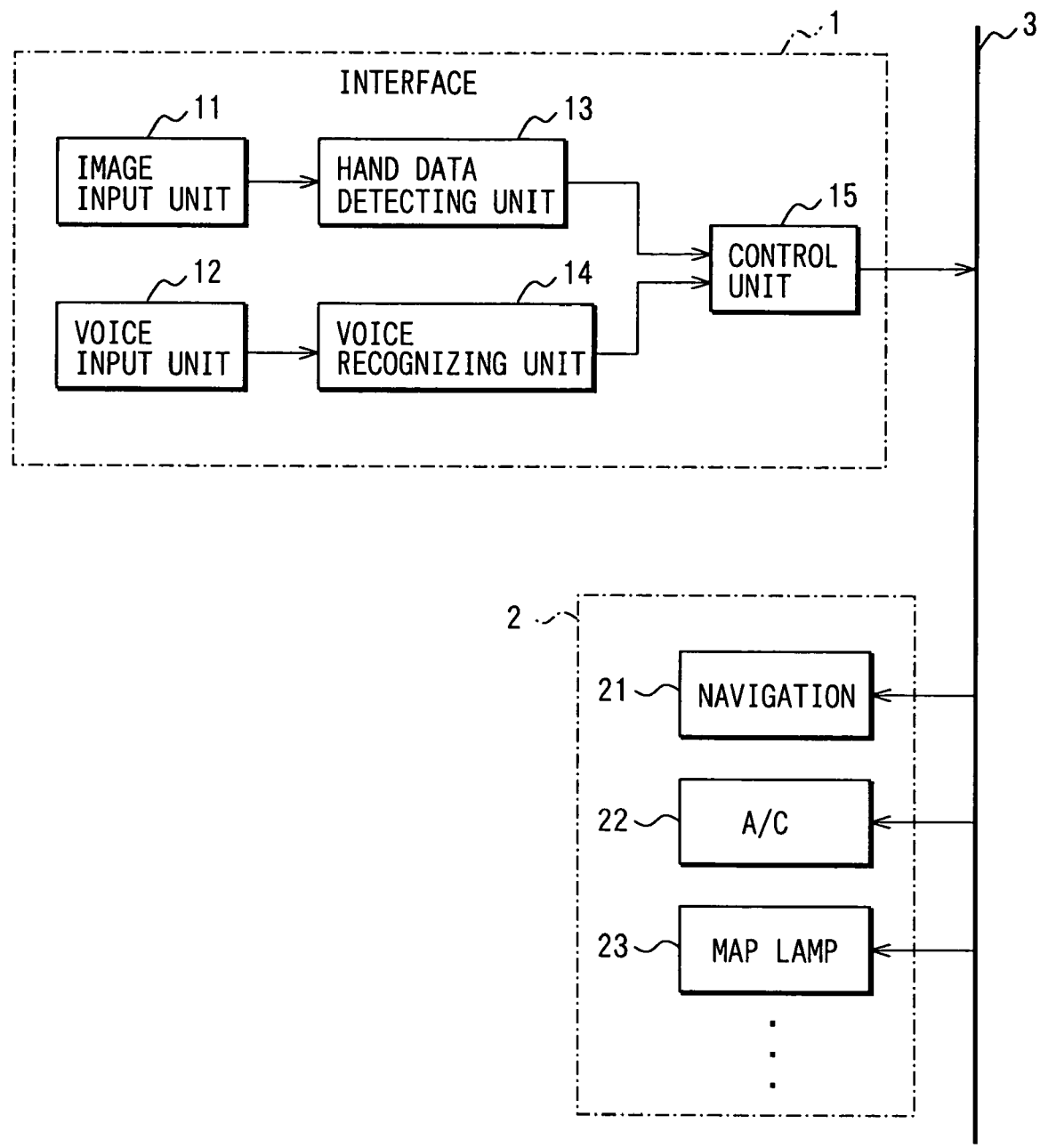
FIG. 1 is a block diagram schematically illustrating the constitution of an interface for car-mounted devices according to a first embodiment and a system using the same.
Figure 2:
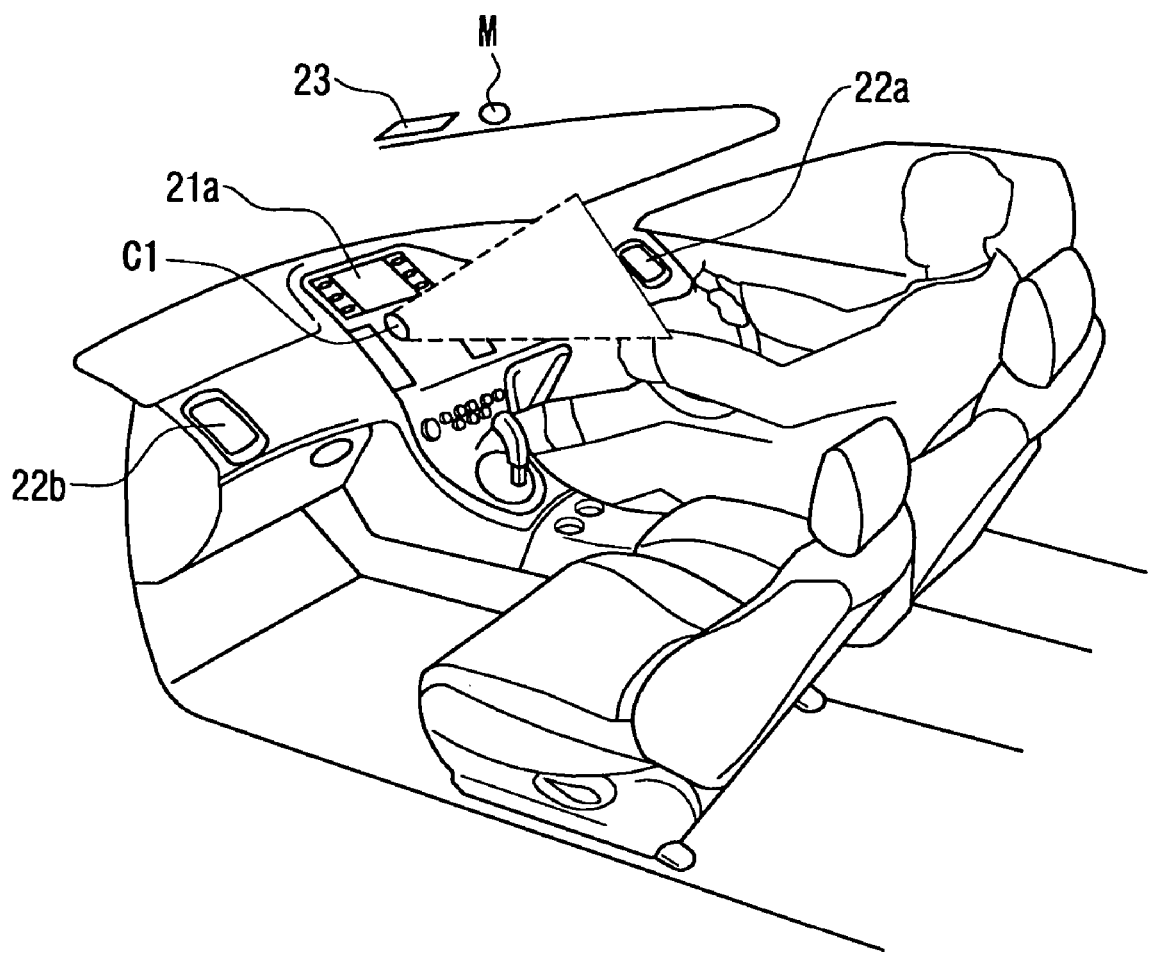
FIG. 2 is a view illustrating the arrangement of devices constituting the interface for car-mounted devices and the arrangement of the car-mounted devices operated through the interface for car-mounted devices according to the first embodiment.

FIG. 1 is a block diagram schematically illustrating the constitution of an interface 1 for car-mounted devices to which the invention is applied and a system using the interface for car-mounted devices, and FIG. 2 is a view illustrating the arrangement of devices constituting the interface 1 for car-mounted devices and the arrangement of the car-mounted devices operated through the interface 1 for car-mounted devices.

As illustrated in FIG. 1, the interface 1 for car-mounted devices according to this embodiment includes an image input unit 11 for imaging the operator who operates the car-mounted devices, a voice input unit 12 for collecting the operator's voice, a hand data detecting unit 13 (corresponds to hand data detecting means) for detecting the hand data representing the state of the operator's hand from the image (hereinafter referred to as "input image") imaged by the image input unit 11, a voice recognizing unit 14 (corresponds to voice recognizing means) for recognizing the voice (hereinafter referred to as "input voice") collected by the voice input unit 12, and an integrated control unit 15 (corresponds to control signal-forming means) for forming a control command for the car-mounted devices based on the inputs from the hand data detecting unit 13 and the voice recognizing unit 14.

The interface 1 for car-mounted devices is connected to a group 2 of car-mounted devices such as navigation 21, air conditioner (A/C) 22, map lamp 23, and etc. via a local area network (hereinafter referred to as "LAN") 3 installed in the car. Referring to FIG. 2, a display screen 21a of the navigation 21 is arranged at a central portion of the instrument panel, vents 22a and 22b of the air-conditioner 22 are arranged at both the right and left ends of the instrument panel, and a map lamp 23 is arranged near the boundary between the ceiling and the windshield. The car-mounted devices constituting the group 2 of car-mounted devices are all well known and are not described here in detail.

Figure 5A:
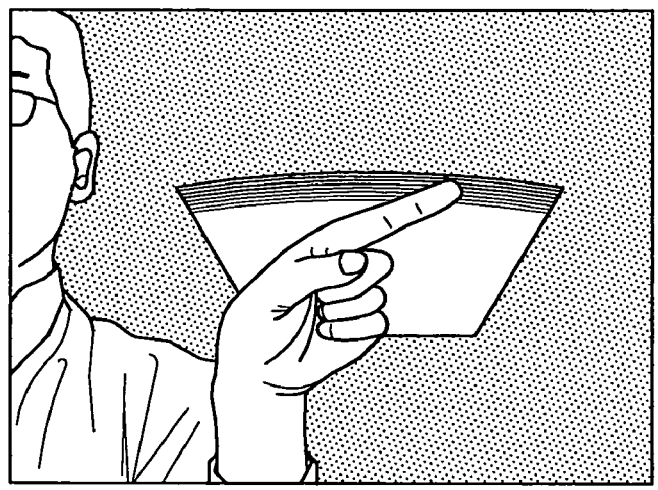
FIGS. 5A-5C are views illustrating an input image, a masked image and a hand portion extracting the image.

The image input unit 11 comprises a CCD camera C1 which is arranged under the display screen of the navigation 21 and is set so as to image the left shoulder portion of the operator from the front of the operator (see FIG. 5A). The voice input unit 12 is a microphone M which is arranged on the side of the operator's seat, on the right side of the map lamp 23 that is arranged at the center of the ceiling in the direction of the car width. Namely, the CCD camera C1 and the microphone M are arranged, regarding the occupant (i.e., the operator) on the operator's seat as the operator, so as to image the state (motion) thereof and to collect the voice.

Figure 3:
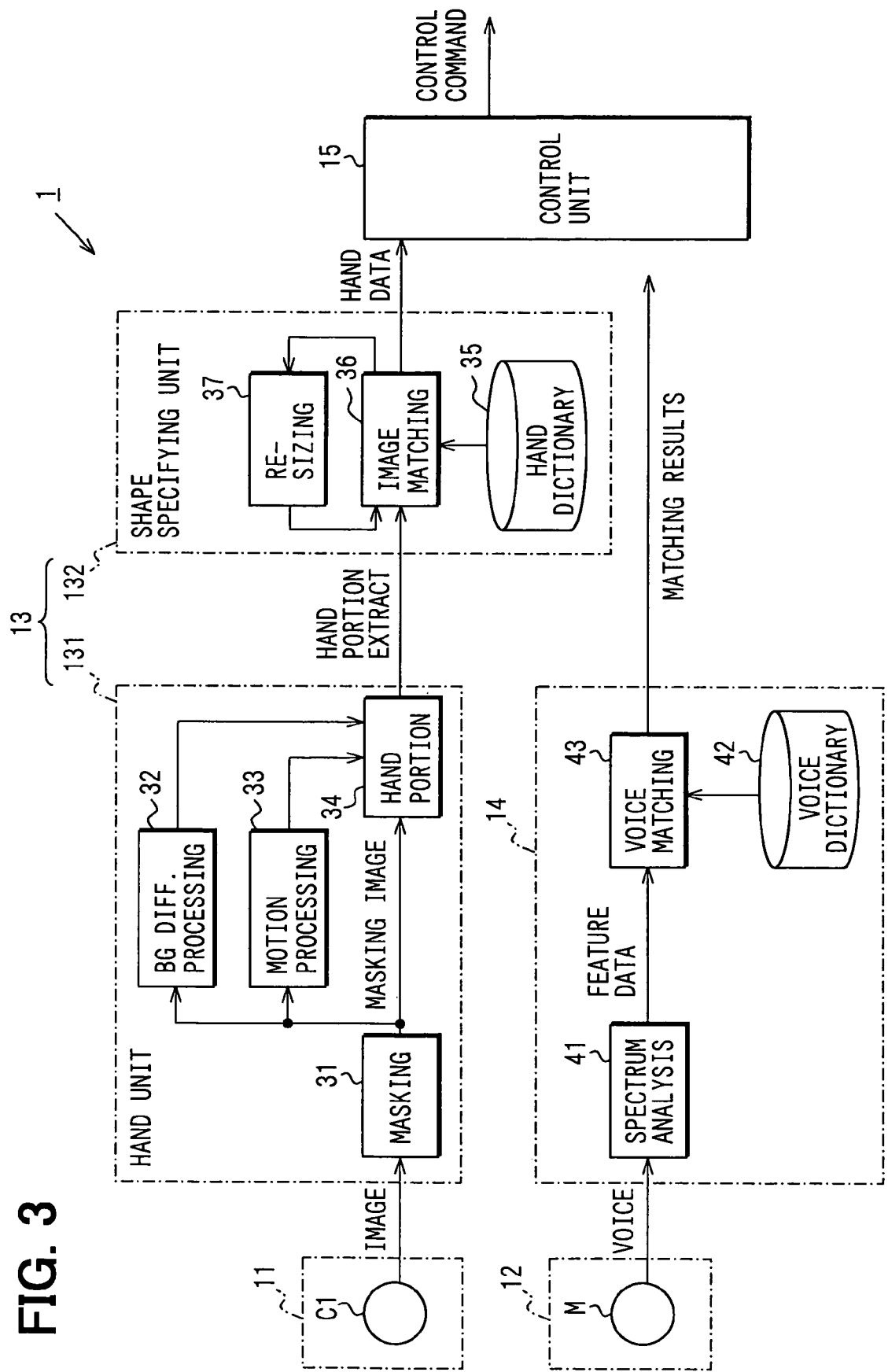
FIG. 3 is a block diagram illustrating the constitution of the interface for car-mounted devices according to the first embodiment.

Next, FIG. 3 is a block diagram illustrating the hand data detecting unit 13 and the voice recognizing unit 14 in detail. FIG. 4 is a flowchart illustrating the integrated control unit 15 in detail. The hand data detecting unit 13, the voice recognizing unit 14 and the integrated control unit 15 are all realized as processing executed on a known microcomputer provided with CPU, ROM, RAM, DSP (digital signal processor), etc.

Referring to FIG. 3, the hand data detecting unit 13 comprises a hand pickup unit 131 (correspond to extracting means and shown as "HAND UNIT") for extracting a region where the hand is imaged (hereinafter referred to as "hand portion") from the input image, and a shape specifying unit 132 (corresponds to shape specifying means) for specifying the shape of the hand portion picked up by the hand pickup unit 131.

Figure 5B:
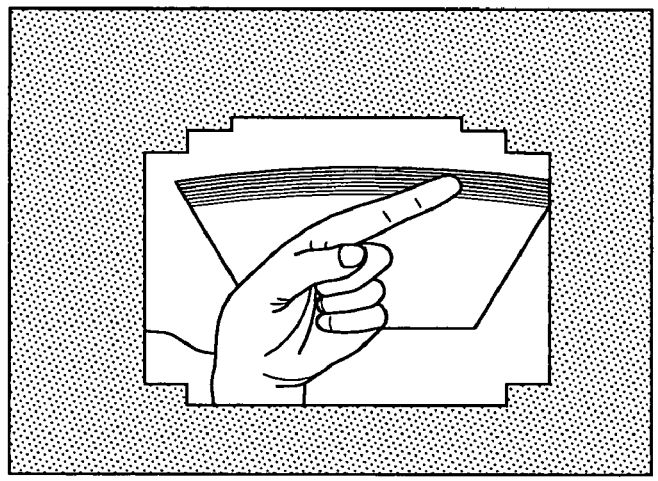

Among them, the hand pickup unit 131 executes a masking processing 31 for removing the image from the input image except the region where the operator shows his hand at the time of operation. Therefore, an image after the masking (hereinafter referred to as "masked image") illustrated in FIG. 5B is obtained from the input image illustrated in FIG. 5A. Here, the region removed by the masking is the one that is set in advance for each of operators by using the method of learning.

Further, the hand pickup unit 131 executes a background difference pickup processing 32 (corresponds to motion permission means and shown as "BG DIFF. PROCESSING") for obtaining the masked image at a preset timing (at a timing when the operator's hand has not been imaged in the input image, such as when the door is opened/closed or at the start of the engine), and registering the thus obtained masked image as a background image, and comparing the registered background image with the masked images that are formed successively, to judge whether the body other than the background is imaged in the masked image.

Figure 6:
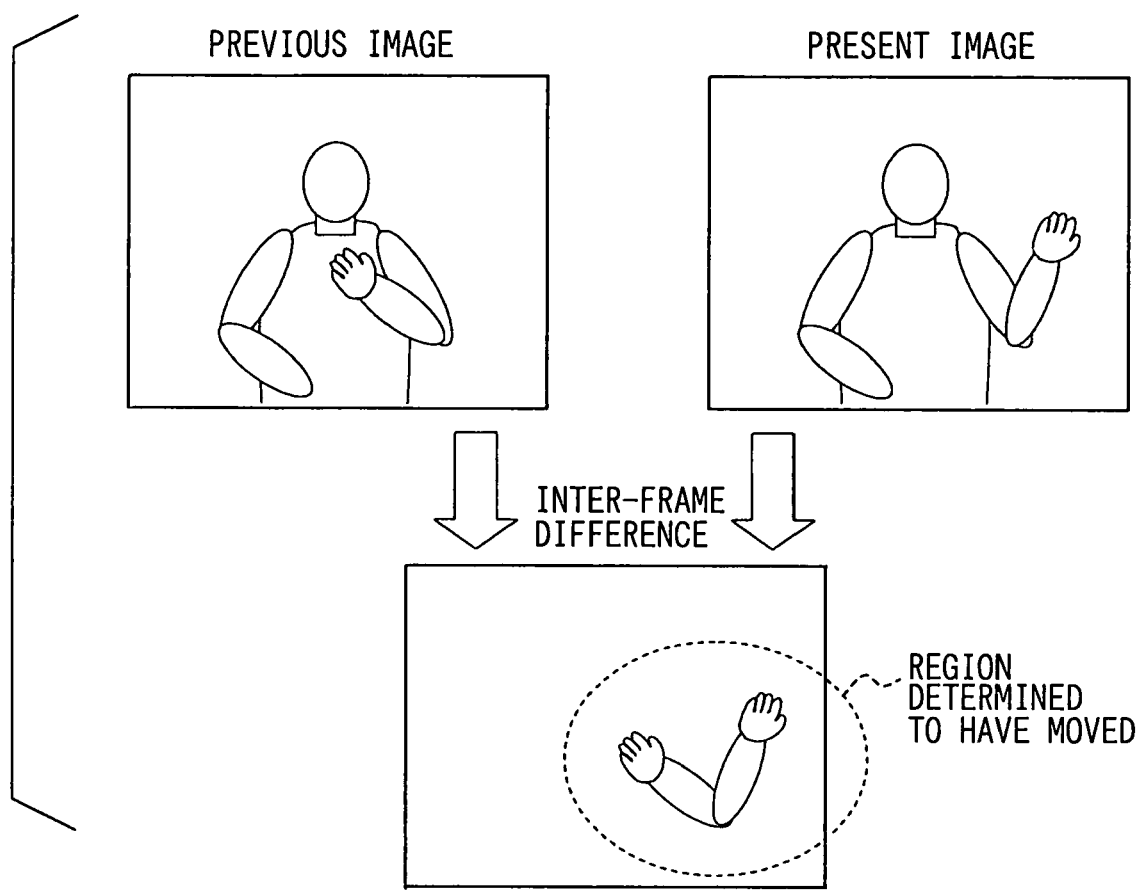
FIG. 6 is a view illustrating the contents of a motion pickup processing.

At the same time, the hand pickup unit 131 executes a motion pickup processing 33 for finding a difference between the frames for the masked images that are successively formed to pick up the region where there is a motion between the frames (hereinafter referred to as "moving region") (see FIG. 6) and for finding average values of the brightness and the color difference (hereinafter referred to as "data for extracting") in the moving region. A majority proportion of the moving region is the one where the hand is imaged (i.e., hand portion), and the scene moving on the background and the passenger on the rear seat are imaged very little. Therefore, the average value of the data for extracting found by the motion pickup processing 33 well expresses the feature of the hand portion.

Figure 5C:
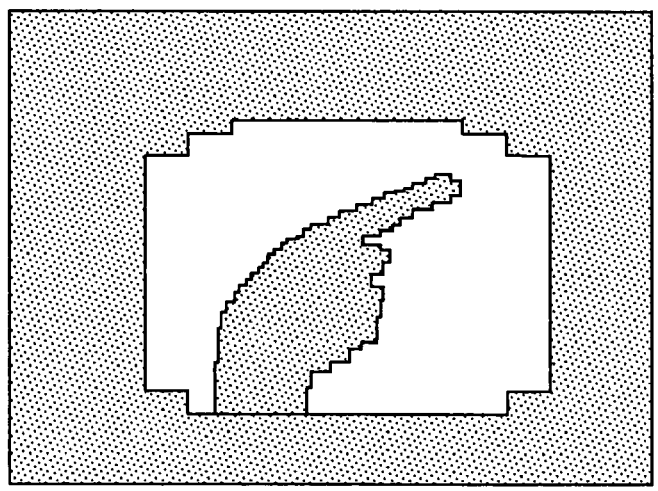

Further, the hand pickup unit 131 executes a hand portion pickup processing 34 by finding differences between the masked images that are successively formed and the data for extracting found in the motion pickup processing 33, and binary encoding the results by using a preset judging threshold value in order to pick up, as the hand portion, a region where the brightness and the color difference are close to an average brightness and an average color difference. This makes it possible to obtain a hand portion pickup image as illustrated in FIG. 5C. In the hand portion pickup processing 34, however, the obtained hand portion pickup image is regarded to be effective preferably only when it is judged in the background difference pickup processing 32 that a body other than the background has been imaged on the masked image, and the obtained hand portion pickup image is fed to the shape specifying unit 132.

Here, instead of validating or invalidating the hand portion pickup image, the motion pickup processing 33 or the hand portion pickup processing 34 may be executed or the motion of the shape specifying portion 132 may be permitted or inhibited based on the result judged by the background difference pickup processing 32.

The shape specifying unit 132 is equipped with a hand dictionary 35 storing the registered patterns representing the shapes of the hand portion and the pattern numbers corresponded thereto. FIG. 7A is a diagram illustrating an example of the hand dictionary 35. In this embodiment, a shape directing the left direction, a shape directing the upper direction and a shape directing the right direction correspond to pattern numbers 1 to 3, respectively.

The shape specifying unit 132 finds the degree of matching between the registered patterns stored in the hand dictionary 35 and the hand portion pickup images supplied from the hand pickup unit 131 relying upon the pattern matching, specifies a registered pattern having the highest degree of matching, and executes an image matching processing 36 to notify a pattern number corresponding to the registered pattern as the hand data to the integrated control unit 15 when the degree of matching of the registered pattern is larger than a preset lower-limit value.

However, when the degree of matching of the specified registered pattern does not reach the lower-limit value, a re-sizing processing 37 is executed to expand or contract the size of the hand portion pickup image, and the matching processing 36 is executed again. In the re-sizing processing 37, a plurality of magnifications (e.g., 0.8 times, 0.9 times, 1.1 times, 1.2 times) have been set in advance. When no registered pattern has a degree of matching that reaches the lower-limit value, although the image matching processing 36 is executed at all of the above magnifications, the hand portion pickup image is canceled as having no corresponding pattern.

Next, as illustrated in FIG. 3, the voice recognizing unit 14 is provided with a voice dictionary 42 to which are registered feature data obtained by extracting features appearing on the frequency spectrum of voice when each target word to be recognized in the voice recognition is uttered. This embodiment registers feature data of demonstrative pronouns such as "that", "it", "this" and "here".

First, the voice recognizing unit 14 finds a frequency spectrum by subjecting the waveform of input voice to the FFT (Fast Fourier transform), and executes a spectrum analyzing processing 41 for extracting the features of the input voice.

When the feature data of the input voice are picked up in the spectrum analyzing processing 41, a voice matching processing 43 is executed to compare the feature data of the voice picked up with the feature data of the demonstrative pronouns registered in the voice dictionary 42, and notify the compared result (presence or absence of matching) to the integrated control unit 15. The voice matching processing 43 may be conducted by a known method, such as by using a neural net, a DP (dynamic programming) matching, or an HMM (hidden Markov model).

The integrated control unit 15 includes a device data table (see FIG. 7B) indicating a correspondence between the pattern numbers notified from the hand data detecting unit 13 and the car-mounted devices, and storing the present operating state of the car-mounted devices. Here, the pattern number 1 (i.e., a state where the hand portion is pointing in the left direction (or right direction as viewed from the operator's side)) is corresponded to the air conditioner vent 22a located at the right end of the instrument panel, the pattern number 2 (i.e., a state where the hand portion is pointing the upper direction) is corresponded to the map lamp 23, and the pattern number 3 (i.e., a state where the hand portion is pointing in the right direction (left direction as viewed from the operator's side)) is corresponded to the air conditioner vent 22b located at the left end of the instrument panel. The air conditioner vents 22a and 22b have two states, i.e., a state where the vents are opened-"OPEN" and a state where the vents are closed-"CLOSE". The map lamp 23 has two states, i.e., a state where the map lamp is turned on-"ON" and a state where the map lamp is turned off-"OFF".

Described below with reference to the flowchart of FIG. 4 is a processing executed by the integrated control unit 15.

When the processing starts, it is first determined whether the voice recognizing unit 14 has input a result of comparison that the voice is in match (feature data of the input voice and the demonstrative pronoun match)(S10). This step is repeated until the above result of comparison is input to stand by.

When the operator utters a demonstrative pronoun and the result of comparison is input from the voice recognizing unit 14 indicating that the voice is in match, the time-counting value of a timer which counts the waiting time is reset (S120), and it is determined whether the hand data (pattern number) is input from the hand data detecting unit 13, i.e., whether the hand portion pickup image matches with the registered pattern (S130). When no hand data is input, it is determined whether the waiting time (time-counting value of the timer) after having confirmed the voice matching is longer than a preset allowable time T1 (e.g., 3 seconds)(S140). When the waiting time is shorter than the allowable time T1, the routine returns to S130. When the waiting time is longer than the allowable time T1, it is so determined that the operator has no intention of operating the car-mounted devices, and the routine returns to S110.

When it is determined at S130 that the hand data (pattern number) is input from the hand data detecting unit 13, reference is made to the device data table based on the input hand data (pattern number) to specify the car-mounted device that is to be controlled (S150).

Then, a control command is formed for changing the operating state that is obtained over to another operating state. Further, the operating state stored in the device data table is updated so as to match with the content of the control command (S160). The thus formed control command is transmitted to the device to be controlled through the LAN 3 in the car (S170), and the routine returns to S110.

In the thus constituted interface 1 for car-mounted devices, only when the operator's gesture is confirmed before the elapse of the allowable time T1 after the operator's uttering of the demonstrative pronoun has been confirmed, the car-mounted devices corresponding to the gesture (shape of hand in this case) is specified as the devices to be controlled whereby a control command is formed and transmitted for changing over the operating state of the devices to be controlled.

When, for example, the operating state of the map lamp 23 stored in the device data table is "OFF" and the operator utters a demonstrative pronoun while performing a gesture of pointing the map lamp 23 (pointing the upper direction), the interface 1 for car-mounted devices forms a control command for changing the operating state of the map lamp 23 to "ON", and the control command is transmitted to the map lamp 23.

According to the interface 1 for car-mounted devices of this embodiment as described above, the device whose operating state is to be changed over is specified by a combination of the voice and the gesture. Thus, even the use of finger-pointing which is a simple gesture, and a demonstrative pronoun which is a simple word makes it possible to greatly decrease a probability that the motion or utterance of word which is not intended by the operator is incorrectly recognized to be meaningful.

Thus, a plurality of car-mounted devices can be reliably operated in a non-contacting manner without the need of leaning complex gestures or a lot of reserved words.

Further, this embodiment uses an average brightness and an average color difference in a region of motion picked up in the motion pickup processing as the data for extracting used in extracting the hand portion from the masked image. Namely, the data for extracting is not used as a fixed value but is varied depending upon the surrounding conditions (weather, direction of incidence of sunlight) that vary from time to time. Therefore, the hand portion can be picked up with a stable precision at all times.

In this embodiment, further, since the hand portion pickup image is regarded to be effective only when the object other than the background is imaged in the background difference pickup processing 32, it is possible to prevent the image matching processing from being wastefully executed by the shape specifying unit 132 without the operator's hand in the input image.

Second Embodiment

A second embodiment will be described next.

This embodiment is constituted in the same manner as the interface 1 for the car-mounted devices of the first embodiment with only some differences in the device data table in the integrated control unit 15, the content of the voice dictionary 42 and the processing by the integrated control unit 15. These differences will now be described.

In this embodiment, the device data table stores a relationship between the pattern numbers and the car-mounted devices, as well as reserved words corresponding to the operations and the operating states of the car-mounted devices (see FIG. 8A). Here, the relationship between the pattern numbers 1 to 3 and the car-mounted devices is the same as that of the first embodiment, and two kinds of reserved words correspond to the air conditioner vents 22a and 22b, i.e., "OPEN" used for placing the vents in the open state and "CLOSE" used for placing the vents in the closed state. Further, two kinds of words are corresponded to the map lamp 23, i.e., "ON" for turning on the map lamp 23 and "OFF" for turning off the map lamp 23.

The voice dictionary 42 registers feature data of the above reserved words. The feature data of input voice picked up in the spectrum analyzing processing 41 are compared with the feature data of the reserved words registered in the voice dictionary 42. A reserved word whose feature data match with that of the input voice is notified to the integrated control unit 15.

The processing S110 to S140 executed by the integrated control unit 15 are quite the same as those of the first embodiment. At next step S150, reference is made to the device data table based on the pattern number and the reserved word notified from the hand data detecting unit 13 and the voice recognizing unit 14, a device to be controlled is specified from the pattern number, and the operation for the device to be controlled is specified from the reversed word. In this case, though not illustrated in the flowchart of FIG. 4, when the reserved word is not corresponding to the device that is specified to be controlled, the routine returns to S110 without forming and transmitting the control command.

At S160 and S170, a control command is formed to cause the device specified at S150 to execute the specified operation. The control command is transmitted to the device to be controlled through the LAN 3 in the car.

In the thus constituted interface 1 for car-mounted devices of this embodiment, the car-mounted device corresponding to the gesture (shape of hand in this case) is specified as a device to be controlled only when the operator's gesture is confirmed after the utterance of a reserved word by the operator is confirmed before the elapse of the allowable time T1, and a control command is formed and transmitted to cause the device to be controlled to execute the operation corresponding to the reserved word.

When, for example, the operator utters "ON" with a gesture of left hand pointing the map lamp 23 (i.e., upper direction), the interface 1 for car-mounted devices forms a control command for turning on the map lamp 23, and the control command is transmitted to the map lamp 23.

According to the interface 1 for car-mounted devices of this embodiment as described above, the devices to be controlled and the operation for the devices are specified by a combination of the voice and gesture, making it possible to greatly decrease a probability that the motion or utterance of word which is not intended by the operator is incorrectly recognized to be meaningful.

By using simple words which enable the operation to be intuitively understood as reserved words, furthermore, the burden for leaning the reserved words is decreased to a sufficient degree, and the effects same as those of the first embodiment are obtained.

In the first and second embodiments, the input of the result of determining the matching and the hand data are confirmed in the order of the result of determining the matching (voice matching) and the hand data. This order, however, may be reversed, or the order of the two may not be fixed.

Third Embodiment

A third embodiment will be described next.

Figure 9:
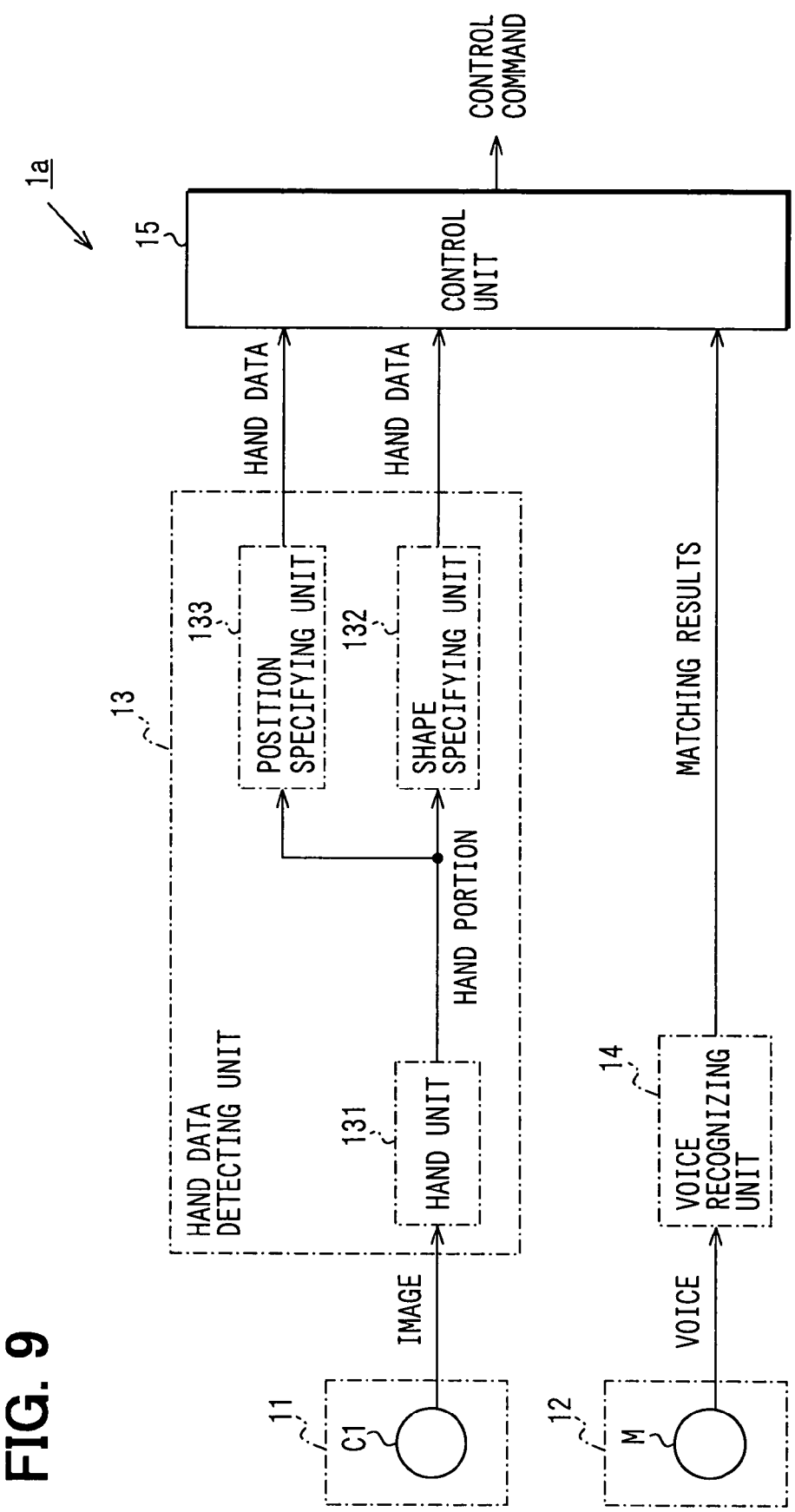
FIG. 9 is a block diagram illustrating the constitution of an interface for car-mounted devices according to the third embodiment.

FIG. 9 is a block diagram illustrating the whole constitution of an interface 1a for car-mounted devices according to this embodiment. In the interface 1a for car-mounted devices of this embodiment, the processing in the hand data detecting unit 13 and in the integrated control unit 15 are partly different from those of the first embodiment. Therefore, different portions will be chiefly described below.

Namely, in the interface 1a for car-mounted devices of this embodiment, the hand data detecting unit 13 is provided with a position specifying unit 133 (corresponds to the position specifying means) in addition to the hand pickup unit 131 and the shape specifying unit 132 constituted in the same manner as those of the first embodiment.

The position specifying unit 133 executes a process of finding the center of gravity of the hand portion based on a hand portion pickup image from the hand pickup unit 131, and notifying the coordinate of the center of gravity (hereinafter referred to as "hand coordinate") to the integrated control unit 15 as hand data representing the position of the operator's hand.

Next, the device control table in the integrated control unit 15 shows a relationship between the pattern numbers and the car-mounted devices while storing identification data for identifying the method of inputting instruction (see FIG. 8B). When the instruction is being input, the identification data indicates whether a combination of the gesture and the utterance of a word be executed only one time (hereinafter referred to as "single instruction") as described in the first embodiment, or the specification of the device to be controlled and the operation for the device to be controlled be executed each one time, i.e., a total of two times (hereinafter referred to as "composite instruction").

The device control table is storing the operating states of the devices in the same manner as in the first embodiment concerning the car-mounted devices to which a single instruction has been set according to the identification data, and is describing the operation specifying data necessary for specifying the operation for the car-mounted devices to which a composite instruction has been set. Here, the relationship between the pattern numbers 1 to 3 and the car-mounted devices is the same as that of the first embodiment. For the air conditioner vents 22a and 22b, identification data are set as a composite instruction, and hand coordinate/wind direction conversion data representing a relationship of wind direction are stored at a position of hand coordinate as operation specifying data. For the map lamp 23, the identification data are set as a single instruction, and the operating state thereof is stored.

Figure 10:
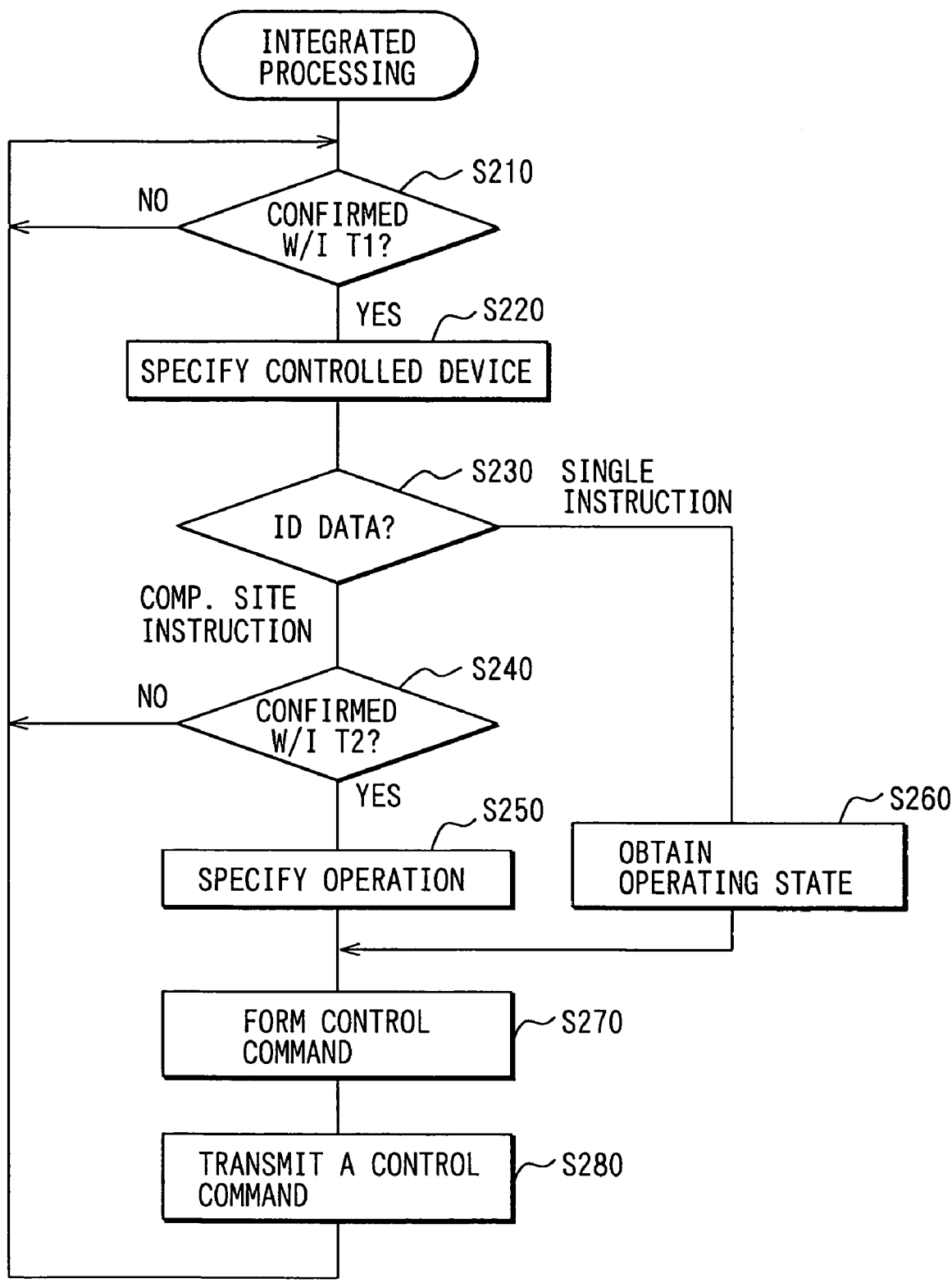
FIG. 10 is a flowchart illustrating the contents of processing executed by the integrated control unit according to the third embodiment.

The processing executed by the integrated control unit 15 will now be described with reference to a flowchart of FIG. 10.

When the process starts, it is, first, determined whether there have been input both the result of voice matching from the voice recognizing unit 14 and the hand data (pattern number) from the hand data detecting unit 13 at an interval within a preset allowable time T1 (S210). When the determination is negative, the same step is repeated to stand by. When the determination is affirmative, reference is made to the device data table based on the hand data (pattern number) that is input to specify the car-mounted device to be controlled (S220). Concretely, the determination at S210 can be realized by S110 to S140 described in the first embodiment.

Next, reference is made to the device data table to determine whether the identification data for the device to be controlled specified at S220 have been set to be either a single instruction or a composite instruction (S230). When the identification data have been set to be the composite instruction, it is determined if there have been input both the result of voice matching from the voice recognizing unit 14 and the hand data (hand coordinate or pattern number) from the hand data detecting unit 13 within a preset allowable time T2 (e.g., 5 seconds)(S240). When the determination is denied, it is so regarded that the operator has no intention of operating the car-mounted devices, and the routine returns to S210.

When the determination at S240 is affirmative, on the other hand, reference is made to the operation specifying data in the device data table based on the hand data (hand coordinate or pattern number) that is input to specify the operation for the device to be controlled (S250). A control command is produced to cause the device specified at S220 to execute the operation specified at S250 (S270). The thus produced control command is transmitted to the device to be controlled through the LAN 3 in the car, and the routine returns to S210.

Further, when it is determined at S230 that the identification data have been set to be a single instruction, the operating state of the device specified at S220 is obtained from the device table (S260), and the routine proceeds to S270 where a control command is formed to change the obtained operating state over to another operating state, so that the operating state stored in the device data table is matched with the content of the control command (S270). The thus formed control command is transmitted to the device to be controlled through the LAN 3 in the car (S280), and the routine returns to S210.

In the thus constituted interface 1a for car-mounted devices, when both the instructing pronoun uttered by the operator and the operator's gesture are confirmed, the car-mounted device corresponded to the gesture (shape of hand in this case) is specified as a device to be controlled. When the identification data for the specified device have been set to be a single instruction, a control command is readily formed and is transmitted to change over the operating state of the device to be controlled.

When the identification data for the specified device have been set to be a composite instruction, the operation corresponded to the gesture (position of hand in this case) is specified if both the utterance of a demonstrative pronoun by the operator and the operator's gesture are confirmed within an allowable time T2, and a control commend is formed and is transmitted to cause the specified device to execute the operation that is specified.

For instance, if a demonstrative pronoun is uttered while pointing by finger the map lamp 23 (car-mounted device to which the identification data are set as a single instruction), the control command for changing over the operating state of the map lamp 23 is transmitted to the map lamp 23 from the interface 1a for car-mounted devices like the case of the first embodiment.

Further, the operator may utter a demonstrative pronoun while pointing to the air conditioner vent 22a (car-mounted device to which the identification data are set as a composite instruction) by his finger and may move his hand to a position to where the air should be blown from the air conditioner vent 22a and may utter again the demonstrative pronoun. Then, a control command is transmitted to the air conditioner 22 from the interface 1a for car-mounted devices to change the blowing direction of the air conditioner vent 22a to the direction indicated by hand.

According to the interface 1a for car-mounted devices of this embodiment, the device to be controlled and the operation for the device to be controlled are specified by a combination of voice and gesture to obtain the same effect as that of the case of the first embodiment.

As for the car-mounted device to which the identification data are set as the composite instruction, in particular, the operation to be executed is specified by a gesture different from that of when the device is to be selected. Therefore, it is allowed to easily specify even the operation which is difficult to be expressed by word such as the one containing a spatial position.

In this embodiment, the instruction is input relying upon the gesture and the demonstrative pronoun to the car-mounted device to which the identification data are set as a single instruction. However, the instruction may be input by using a gesture and a reserved word like in the case of the second embodiment.

In this embodiment, further, the direction in which the air conditioner blows out is controlled relying upon the position of hand (hand coordinate). It is, however, also allowable to control the position of the sound image of car audio equipment.

Fourth Embodiment

A fourth embodiment will be described next.

Figure 11:
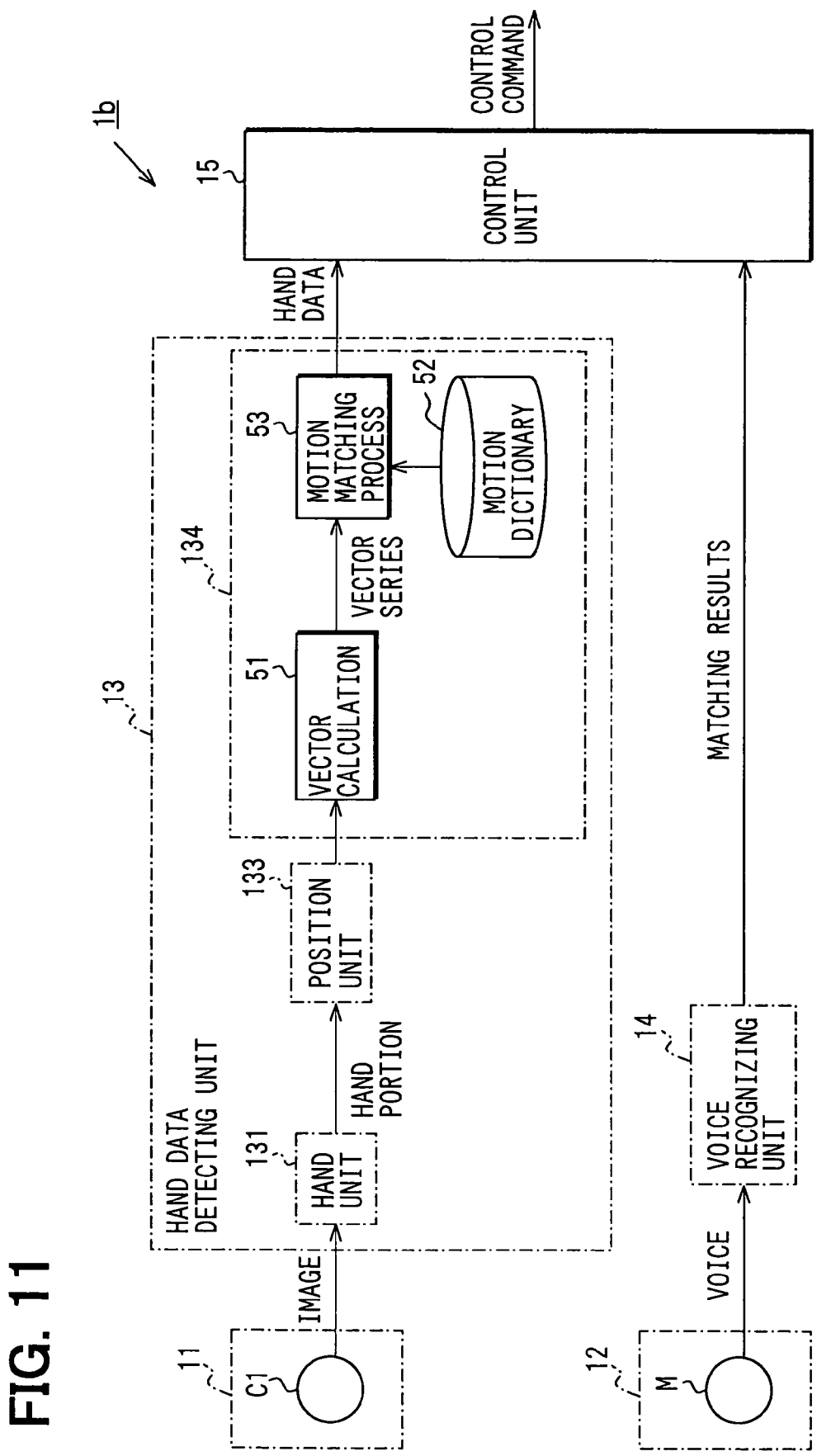
FIG. 11 is a block diagram illustrating the constitution of the interface for car-mounted devices according to a fourth embodiment.

FIG. 11 is a block diagram illustrating the whole constitution of an interface 1b for car-mounted devices according to this embodiment. In the interface 1b for car-mounted devices of this embodiment, the processings in the hand data detecting unit 13 and in the integrated control unit 15 are partly different from those of the first embodiment. Therefore, different portions will be chiefly described below.

Namely, in the interface 1b for car-mounted devices of this embodiment, the hand data detecting unit 13 includes a hand pickup unit 131 constituted in the same manner as that of the first embodiment, and a position specifying unit 133 constituted in the same manner as that of the third embodiment and, further, includes a motion specifying unit 134 (corresponds to the motion specifying means) in place of the shape specifying unit 132.

Figures 12A, 12B, 12C:
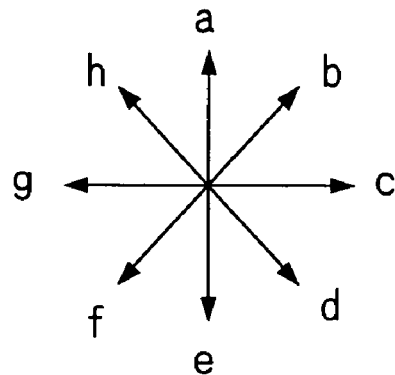
FIGS. 12A-12C are diagram illustrating a motion dictionary and a device data table according to the fourth embodiment.

The motion specifying unit 134 includes a motion dictionary 52 storing vector series expressing a time-series change in the motion vector which are corresponded to the pattern numbers. FIG. 12B illustrates a motion dictionary 52. In this embodiment, a vector series corresponding to the motion of hand in the upper direction, a vector series corresponding to the motion (SHAKE) for shaking the hand right and left, and a vector series corresponding to the motion (CIRCLE) for drawing a circle by hand, are corresponded to the pattern numbers 1 to 3. Here, as illustrated in FIG. 12A, the motion vector is expressed by eight directions obtained by equally dividing a circle by 8, and symbols a to h are assigned to the vectors. Namely, the vector series is expressed as a series of symbols.

The motion specifying unit 134, first, executes a vector calculation processing 51 for finding a motion vector from a difference between the two continuous hand coordinates based on the hand coordinates that are time-seriesly input from the position specifying unit 133.

Further, a motion matching processing 53 is executed to find a degree of matching between a vector series (hereinafter referred to as "input vector series") expressed by the motion vectors successively calculated by the vector calculation processing 51 and a vector series (hereinafter referred to as "registered vector series") registered to the motion dictionary 52 relying upon the pattern matching, to thereby specify a registered vector series having the highest degree of matching, and to notify the pattern number corresponding to the registered vector series to the integrated control unit 15 when the degree of matching is greater than a preset lower-limit value. Here, however, no pattern is notified when the degree of matching of the specified and registered vector series is not reaching the lower-limit value.

As the method of pattern matching, there can be used the same method as that of the voice matching processing 43. In particular, a DP matching is desirably used effecting the matching while imparting flexibility to the time axis.

Referring next to FIG. 12C, the device control table in the integrated control unit 15 is showing a relationship between the pattern numbers and the car-mounted devices and is storing the present operating state of the car-mounted devices like that of the first embodiment. Here, the pattern number 1 (i.e., motion for moving the hand in the upper direction) is corresponded to the map lamp 23, the pattern number 2 (i.e., motion for shaking the hand right and left) is corresponded to door mirrors (not shown), and a pattern number 3 (i.e., motion for drawing a circle by hand) is corresponded to the air conditioner vents 22a and 22b. The air conditioner vents 22a and 22b have two states, i.e., a state "OPEN" where the vents are opened and a state "CLOSE" where the vents are closed, the map lamp 23 has two states, i.e., a state "ON" where the lamp is turned on and a state "OFF" where the lamp is turned off, and the door mirrors have two states, i.e. a state "OPEN" where the mirrors are opened and a state "CLOSE" where the mirrors are folded.

The integrated control unit 15 executes the same processing as that of the first embodiment (see FIG. 4).

In the thus constituted interface 1b for car-mounted devices, the car-mounted device corresponded to the gesture (motion of hand in this case) is specified as the device to be controlled only when the operator's gesture is confirmed after the operator's utterance of a demonstrative pronoun is confirmed before the elapse of the allowable time T1, and the control command is formed and is transmitted to change over the operating state of the device to be controlled.

When, for example, the operating state of the door mirror stored in the device data table is "CLOSE", the operator utters a demonstrative pronoun to perform a gesture (i.e., shake hand right and left) corresponded to the door mirrors. The interface 1b for car-mounted devices forms a control command for changing the operating state of the door mirrors over to "OPEN", and the control command is transmitted to the door mirrors.

As described above, the interface 1b for car-mounted deices of this embodiment is quite the same as that of the first embodiment except that the gesture corresponded to the car-mounted devices is not the shape of hand but is the motion of hand, to obtain the same effect.

Fifth Embodiment

A fifth embodiment well be described next.

Figure 13:
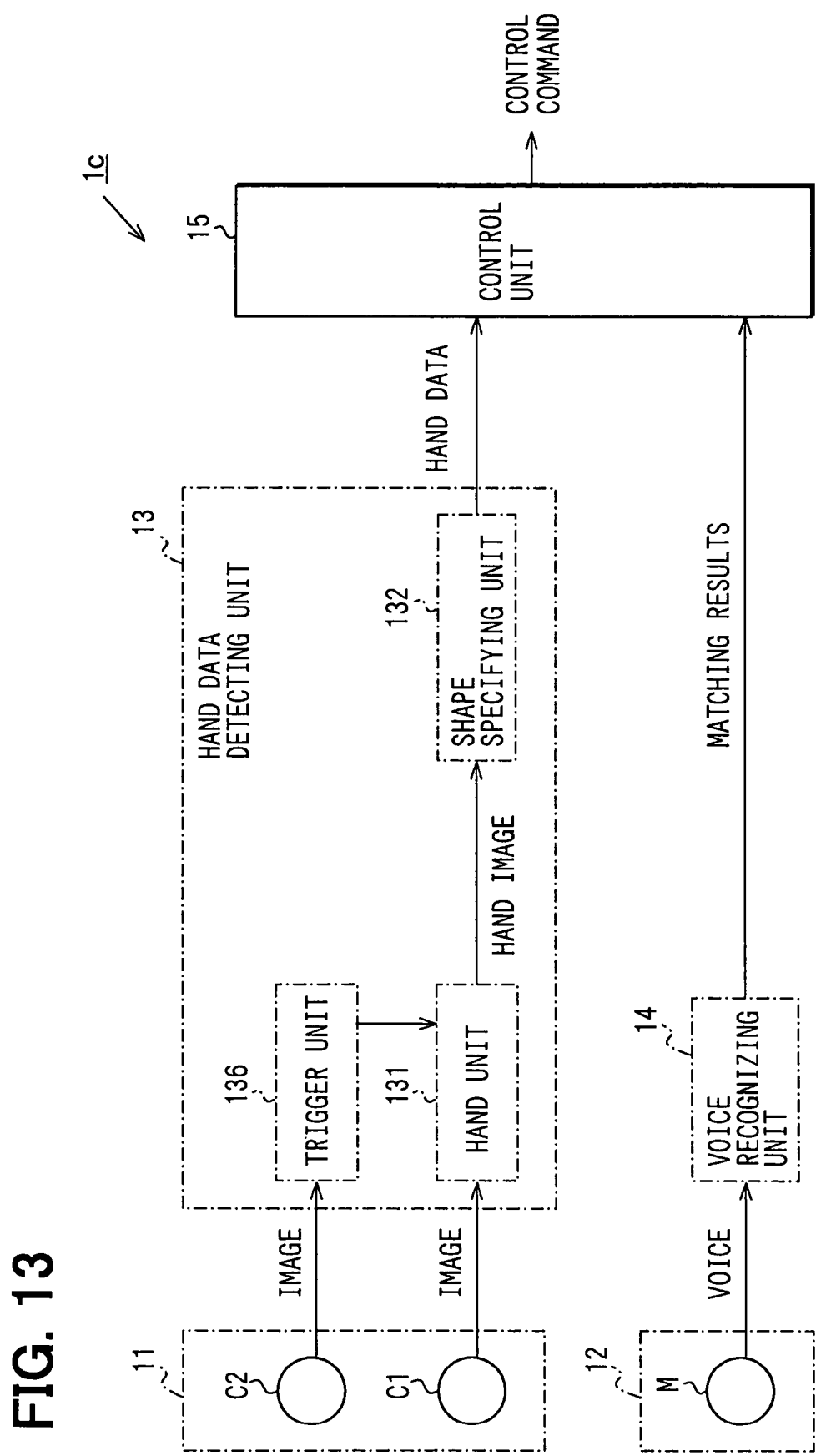
FIG. 13 is a block diagram illustrating the constitution of the interface for car-mounted devices according to a fifth embodiment.
Figure 14:
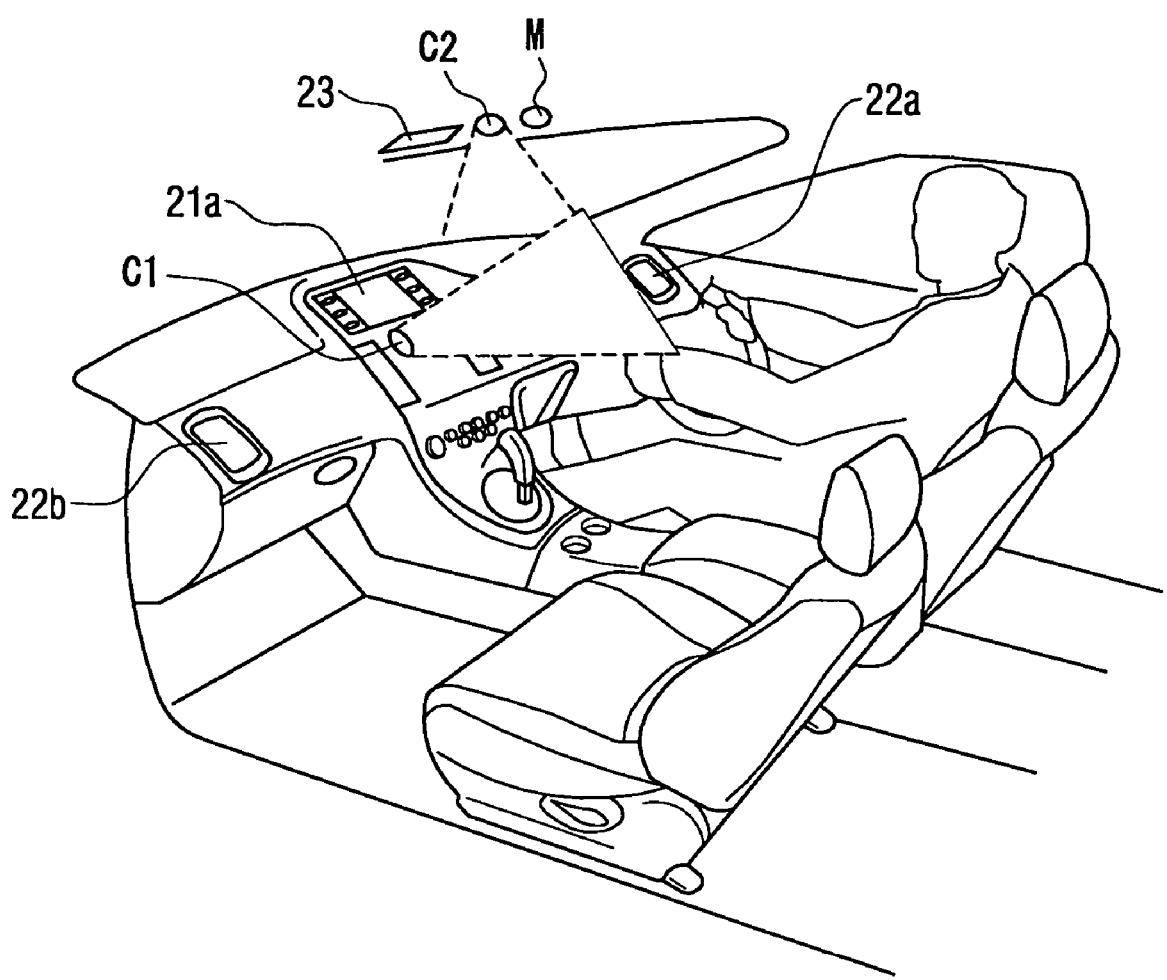
FIG. 14 is a view illustrating the arrangement of devices constituting the interface for car-mounted devices and the arrangement of the car-mounted devices operated through the interface for car-mounted devices according to the fifth embodiment.

FIG. 13 is a block diagram illustrating the constitution of an interface 1c for car-mounted devices according to the embodiment, and FIG. 14 is a view illustrating the devices constituting the interface 1c for car-mounted devices and illustrating the arrangement of the devices operated through the interface 1c for car-mounted devices.

In the interface 1c for car-mounted devices of this embodiment, the constitution of the image input unit 11 and the processing in the hand data detecting unit 13 are partly different from those of the first embodiment. Therefore, these different portions will be chiefly described.

In the interface 1c for car-mounted devices of this embodiment as illustrated in FIG. 13, the image input unit 11 comprises a pair of CCD cameras C1 and C2 for imaging the operator who operates the car-mounted devices. Referring to FIG. 14, the one CCD camera C1 is arranged under the display screen of the navigation 21 like that of the first embodiment to image the left shoulder portion of the operator from the front of the operator. The other CCD camera C2 is arranged between the map lamp 23 and the microphone M installed on the ceiling, and images the left shoulder portion of the operator from the upper direction of the operator.

Referring to FIG. 13, further, the hand data detecting portion 13 includes a trigger unit 136 (corresponds to operation permission means) in addition to the hand pickup unit 131 and the shape specifying unit 132 constituted similarly to those of the first embodiment.

The trigger unit 136 receives an input image from the CCD camera C2 at a preset timing (timing at which the operator's hand is not imaged on the input image such as at the opening and closure of the door, at the start of the engine, etc.), registers the thus received input image as the background image, compares the registered background image with the input images successively input from the CCD camera C2 to determine if the body other than the background is imaged on the input image, i.e., executes the same processing as the background difference pickup processing 32 in the hand pickup unit 131.

Hereinafter, the processings in the hand pickup unit 131 and shape specifying unit 132 constituting the hand data detecting unit 13, in the voice recognizing unit 14 and in the integrated control unit 15 are the same as those of the case of the first embodiment.

Here, only when it is determined that the body other than the background is imaged on the input image by the trigger unit 136, the hand pickup unit 131 validates the processed results (hand portion pickup image) and supplies it to the shape specifying unit 132. The operation of the hand pickup unit 131 may be started or stopped instead of validating or invalidating the processed result.

The thus constituted interface 1c for car-mounted devices of this embodiment not only makes it possible to obtain the same effect as that of the first embodiment but also to reliably suppress erroneous operation that reacts with the body other than the hand since the position of the hand in performing a gesture can be confirmed in a three-dimensional manner due to input images from the two cameras C1 and C2 that are imaging at different angles.

Sixth Embodiment

A sixth embodiment will be described next.

Figure 15:
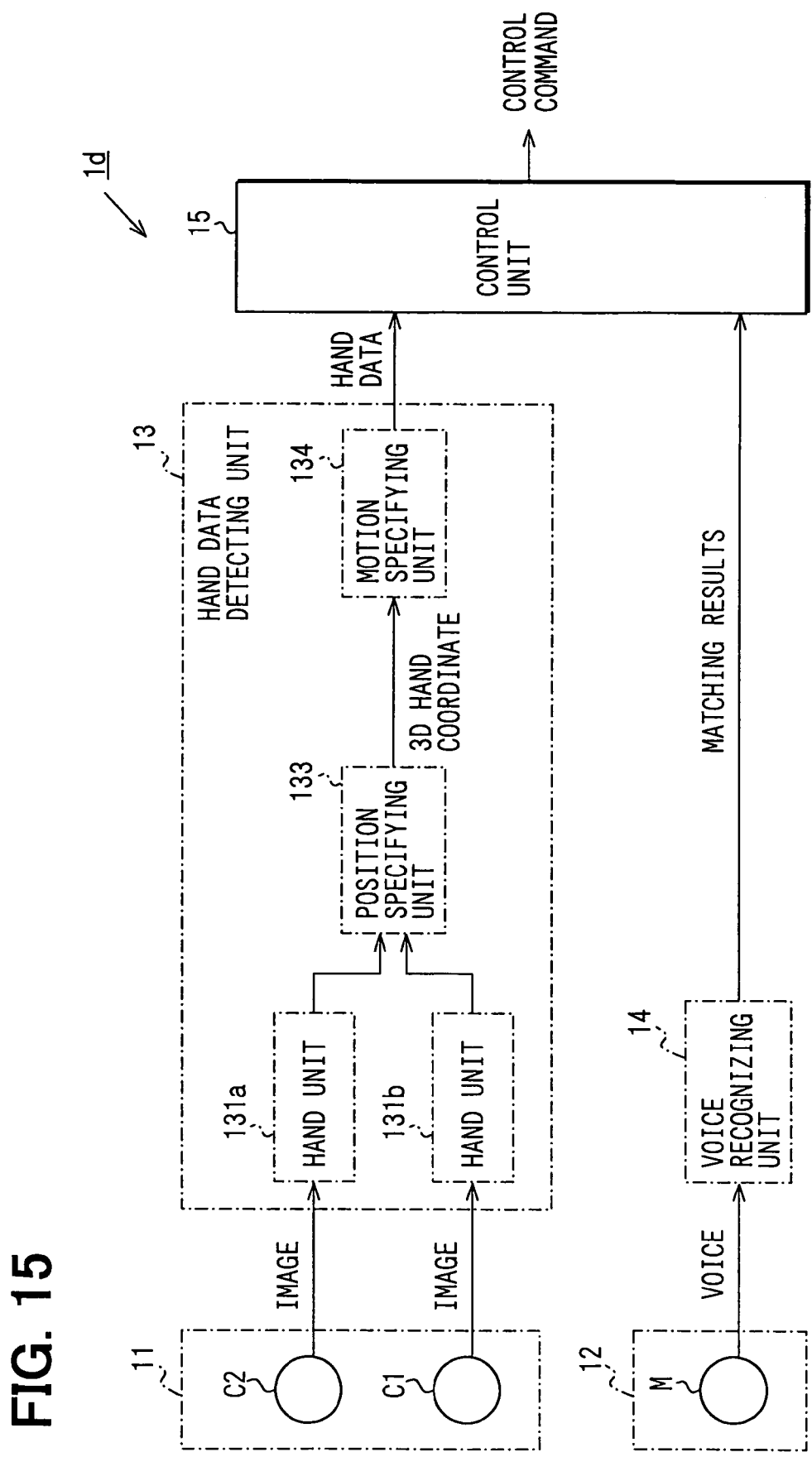
FIG. 15 is a block diagram illustrating the constitution of the interface for car-mounted devices according to a sixth embodiment.

FIG. 15 is a block diagram illustrating the whole constitution of an interface 1d for car-mounted devices according to this embodiment. In the interface 1d for car-mounted devices of this embodiment, the constitution of the image input unit 11 and the processing in the hand data detecting unit 13 are partly different from those of the fourth embodiment (see FIG. 11). Therefore, different portions will be chiefly described below.

Namely, in the interface 1d for car-mounted devices of this embodiment as illustrated in FIG. 15, the image input unit 11 comprises a pair of CCD cameras C1 and C2 for imaging the operator who operates the car-mounted devices, and the arrangement thereof is the same as that of the case of the fifth embodiment (see FIG. 14).

In order to process the input images from the CCD cameras C1 and C2, the hand data detecting unit 13 includes a pair of hand pickup units 131a and 131b constituted in the same manner as that of the first embodiment, a position specifying unit 133 for finding hand coordinates (coordinate (x, y), coordinate (x, z)) based on the hand portion pickup images from the hand pickup units 131a and 131b to find a three-dimensional hand coordinate by integrating the two coordinates, and a motion specifying unit 134 constituted in the same manner as that of the fourth embodiment but using the motion vectors expressed in a three-dimensional manner.

The thus constituted interface 1d for car-mounted devices of this embodiment not only makes it possible to obtain the same effect as that of the third embodiment but also to input other kinds of instructions since it follows the three-dimensional motion of the hand offering an increased degree of freedom in the motion (gesture) of hand that can be recognized.

In this embodiment, the hand data detecting unit 13 detects the position and motion of hand in a three-dimensional manner, but may further be so constituted as to detect the shape of hand in a three-dimensional manner.

In the foregoing were described several embodiments of the invention. The invention, however, is in no way limited to the above embodiments only but can be put into practice in a variety of modes.

In the above embodiments, for example, the image input unit 11 was constituted by only a camera for imaging the passenger at the operator's seat. However, the camera may be provided for each seat so that an instruction can be input relying upon the voice and the gesture by passengers sitting on the seats other than the operator's seat.

In the above embodiments, further, CCD cameras were used for constituting the image input unit 11. It is, however, also allowable to use an infrared ray camera. In this case, the operator can be reliably imaged irrespective of the brightness in the compartment.

In the above embodiments, gestures used for specifying the devices to be controlled and for specifying the operations for the devices to be controlled, are not limited to those described in the embodiments but may be the one that utilizes any one of the position of hand, motion of hand or shape of hand, or may further be the one that utilizes the combination thereof.

In embodiments other than the second embodiment, further, the voice recognizing unit 14 may be so constituted as to recognize the reserved words other than the demonstrative pronouns.

What is claimed is:

1. An interface for car-mounted devices comprising:
   hand data detecting means for detecting hand data indicative of a state of a hand of an operator;
   voice recognizing means for recognizing a voice utterance of the operator; and
   control signal-forming means for specifying a subject device to be controlled among the car-mounted devices and a commanded control operation of the subject device based upon a combination of a result of the detection made by the hand data detecting means and a result of the recognition made by the voice recognizing means, and thereafter forming a corresponding control signal for the subject device, wherein
   when a preset demonstrative pronoun that has been set in advance is recognized by the voice recognizing means, the control signal-forming means specifies the subject device based on the hand data detected by the hand data detecting means, and forms the control signal, which changes an operating state of the subject device.

2. An interface for car-mounted devices according to claim 1, wherein the state of the hand of the operator expressed by the hand data includes at least one of a shape of the hand, a motion of the hand and a position of the hand.

3. An interface for car-mounted devices according to claim 1, wherein:
the control signal-forming means evaluates a combination of the subject device, which is detected by the hand data extracting means, and the commanded control operation of the subject device, which is recognized by the voice recognizing means; and
the control signal-forming means invalidates the formed control signal when the control signal-forming means determines that the commanded control operation cannot be implemented by the subject device upon the evaluation of the combination of the subject device and the commanded control operation of the subject device.

4. An interface for car-mounted devices according to claim 1, wherein:
the voice recognizing means determines the commanded control operation of the subject device when a command, which is indicated by the voice utterance of the operator, matches with a corresponding one of a plurality of predetermined control operations of the subject device; and
when the voice recognizing means determines the commanded control operation of the subject device, the voice recognizing means sends a signal of determination to the hand data detecting means as a trigger for determining the state of the hand of the operator.

5. An interface for car-mounted devices comprising:
hand data detecting means for detecting hand data indicative of a state of a hand of an operator;
voice recognizing means for recognizing a voice utterance of the operator; and
control signal-forming means for specifying a subject device to be controlled among the car-mounted devices and a commanded control operation of the subject device based upon a combination of a result of the detection made by the hand data detecting means and a result of the recognition made by the voice recognizing means, and thereafter forming a corresponding control signal for the subject device, wherein
when the control signal forming means specifies the subject device based on the hand data detected by the hand data detecting means and determines that a reserved word, which is associated with the control operation of the subject device, is recognized by the voice recognizing means, the control signal-forming means forms the control signal, which commands the subject device to execute the operation corresponding to the reserved word.

6. An interface for car-mounted devices comprising:
hand data detecting means for detecting hand data indicative of a state of a hand of an operator;
voice recognizing means for recognizing a voice utterance of the operator; and
control signal-forming means for specifying a subject device to be controlled among the car-mounted devices and a commanded control operation of the subject device based upon a combination of a result of the detection made by the hand data detecting means and a result of the recognition made by the voice recognizing means, and thereafter forming a corresponding control signal for the subject device, wherein
when the voice recognizing means recognizes a preset demonstrative pronoun that has been set in advance, the control signal-forming means specifies the subject device based on the hand data detected by the hand data detecting means; and
when the voice recognizing means recognizes a reserved word, which is associated with the control operation of the subject device, during a preset allowable time period measured from the time of specifying the subject device, the control signal forming means forms the control signal, which commands the subject device to execute the operation corresponding to the reserved word.

7. An interface for car-mounted devices comprising:
hand data detecting means for detecting hand data indicative of a state of a hand of an operator;
voice recognizing means for recognizing a voice utterance of the operator; and
control signal-forming means for specifying a subject device to be controlled among the car-mounted devices and a commanded control operation of the subject device based upon a combination of a result of the detection made by the hand data detecting means and a result of the recognition made by the voice recognizing means, and thereafter forming a corresponding control signal for the subject device, wherein
when the voice recognizing means recognizes a preset demonstrative pronoun that has been set in advance, the control signal-forming means specifies the subject device based on the hand data detected by the hand data detecting means; then
when the preset demonstrative pronoun is recognized by the voice recognizing means again during a preset allowable time period measured from the time of specifying the subject device, the control signal-forming means specifies the commanded control operation of the subject device based on the hand data detected by the hand data detecting means and forms the control signal, which commands the subject device to execute the commanded control operation.

8. An interface for car-mounted devices according to claim 1, further comprising operation permission means for detecting a position of the hand of the operator and permitting the operation of the hand data detecting means or the control signal-forming means when the position of the hand of the operator exists in a predetermined region in a frame of an image captured by a camera.

9. An interface for car-mounted devices according to claim 8, wherein the operation permission means detects the position of the hand of the operator based on the input image from the camera.

10. An interface for car-mounted devices according to claim 1, wherein the hand data detecting means includes:
extracting means for extracting a hand portion from an input image received from a camera that captures an image of the hand of the operator, wherein the hand portion is a region that is configured to generally match with a shape of the captured image of the hand; and
shape specifying means for comparing a shape of the hand portion picked up by the extracting means with shapes of templates that have been provided in advance and thereby specifying a shape of the most matched template as the shape of hand; and
wherein the shape of hand specified by the shape specifying means is used as the hand data.

11. An interface for car-mounted devices according to claim 1, wherein the hand data detecting means includes:

extracting means for extracting a hand portion from an input image received from a camera that captures an image of the hand of the operator, wherein the hand portion is a region that is configured to generally match with a shape of the captured image of the hand; and position specifying means for specifying a center of gravity of the hand portion picked up by the extracting means as a position of hand, wherein the position of hand specified by the position specifying means is used as the hand data.

12. An interface for car-mounted devices according to claim 1, wherein the hand data detecting means includes:

extracting means for extracting a hand portion from an input image received from a camera that captures an image of the hand of the operator, wherein the hand portion is a region that is configured to generally match with a shape of the captured image of the hand; and position specifying means for specifying a center of gravity of the hand portion picked up by the extracting means as a position of hand; and motion specifying means for specifying a time-series change in the position of hand specified by the position specifying means as the motion of hand, wherein the motion of hand specified by the motion specifying means is used as the hand data.

13. An interface for car-mounted devices according to claim 10, wherein the extracting means uses at least either the brightness or the color data of pixels constituting the input image as the data for extracting, and uses, as the hand portion, a region in an allowable range in which the data for extracting have been set in advance in the input image.

14. An interface for car-mounted devices according to claim 13, wherein the hand data extracting means finds a difference between time-series frames in a predetermined region of the input image to pick up a region where there is a high possibility of existence of a motion of the hand in the input image, and sets an allowable range of data for extracting based on an average value of data for extracting in the region that is picked up.

15. An interface for car-mounted devices according to claim 1, wherein the hand data detecting means detects the hand data in a three-dimensional manner based on the input images from a plurality of cameras arranged at different positions.

16. An interface for car-mounted devices according to claim 1, wherein the control signal formed by the control signal-forming means is transmitted to the subject device through a communication network connecting the car-mounted devices to each other.

17. An interface for car-mounted devices according to claim 11, wherein the extracting means uses at least either the brightness or the color data of pixels constituting the input image as the data for extracting, and uses, as the hand portion, a region in an allowable range in which the data for extracting have been set in advance in the input image.

18. An interface for car-mounted devices according to claim 12, wherein the extracting means uses at least either the brightness or the color data of pixels constituting the input image as the data for extracting, and uses, as the hand portion, a region in an allowable range in which the data for extracting have been set in advance in the input image.

19. An interface for car-mounted devices comprising:

hand data detecting means for detecting hand data indicative of a state of a hand of an operator;

voice recognizing means for recognizing a voice utterance of the operator; and control signal-forming means for specifying a subject device to be controlled among the car-mounted devices and a commanded control operation of the subject device based upon a combination of a result of the detection made by the hand data detecting means and a result of the recognition made by the voice recognizing means, and thereafter forming a corresponding control signal for the subject device, wherein the control signal-forming means specifies the subject device based on the result of the detection made by the hand data detecting means, and the control signal-forming means specifies the commanded control operation of the subject device based on the result of the recognition made by the voice recognizing means.

* * * * *